3,363,185
AUXILIARY REFERENCE SIGNAL GENERATING MEANS FOR CONTROLLING VEHICULAR TRAFFIC FLOW OR OTHER MOVING ELEMENTS
George H. Sanderson, New Hyde Park, N.Y., Nicholas T. Saviano, Westport, Conn., and Joseph E. Zupanick, Westbury, N.Y., assignors to Sperry Rand Corporation, Great Neck, N.Y., a corporation of Delaware
Filed May 4, 1965, Ser. No. 453,105
10 Claims. (Cl. 328—72)

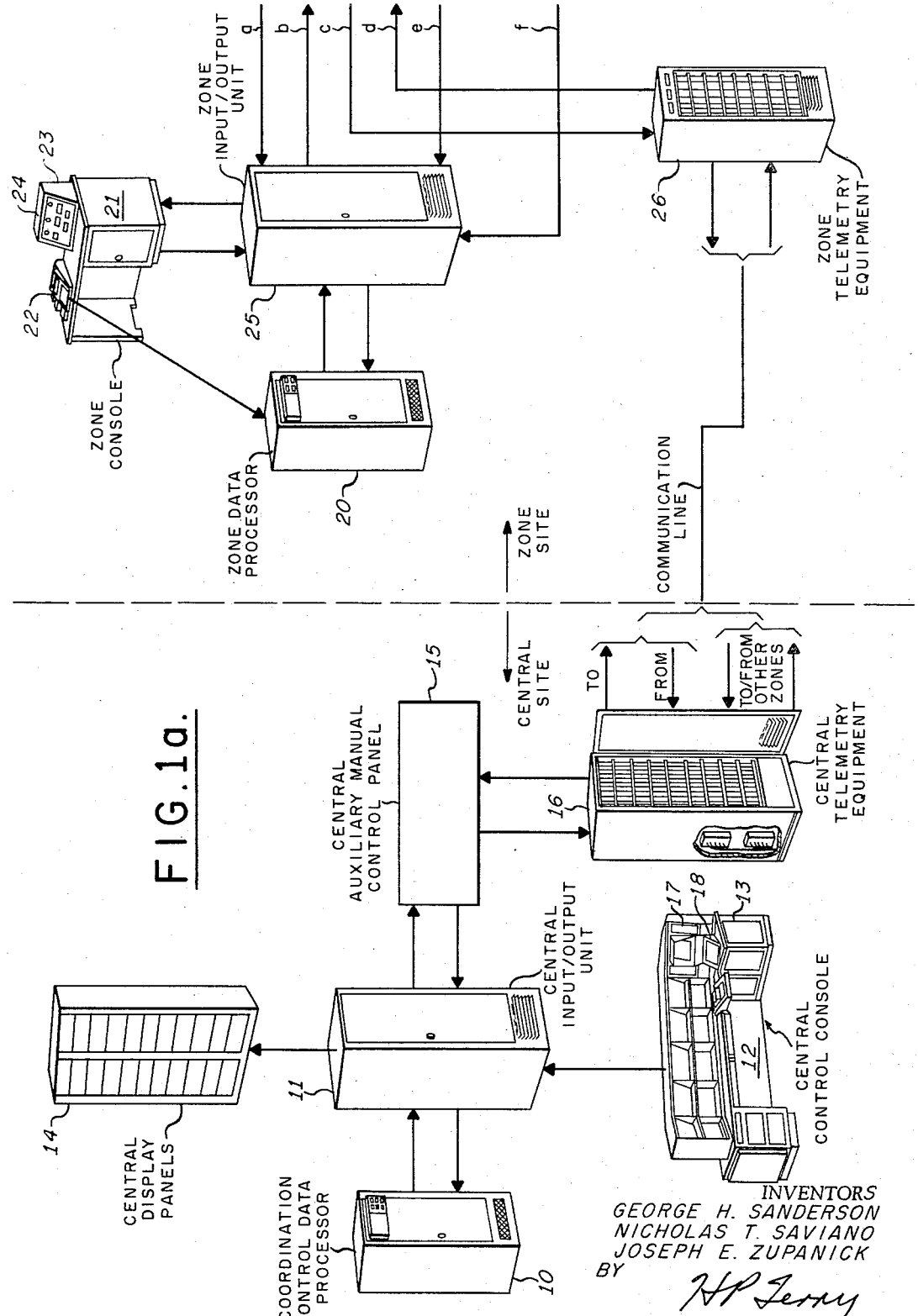

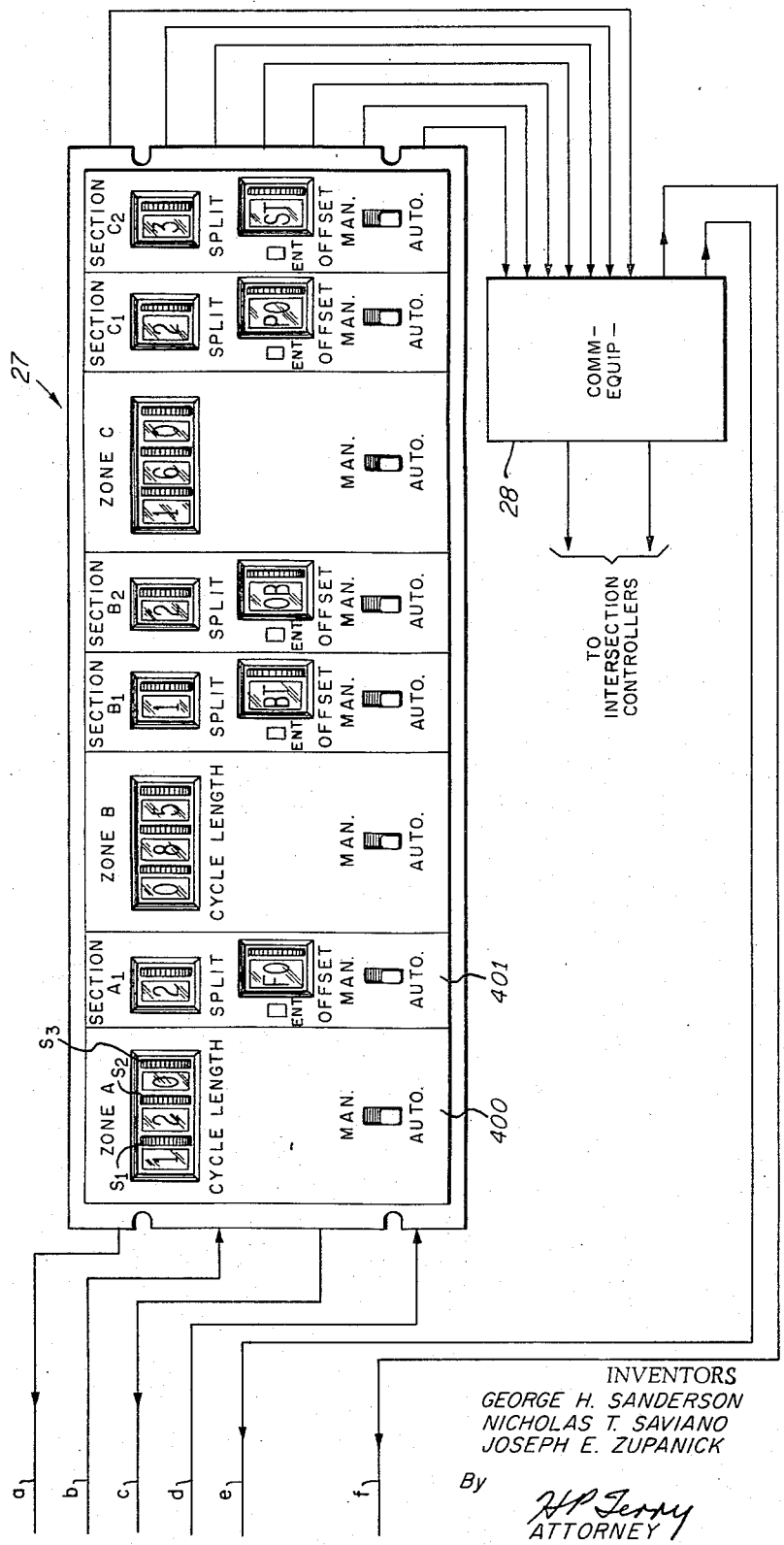

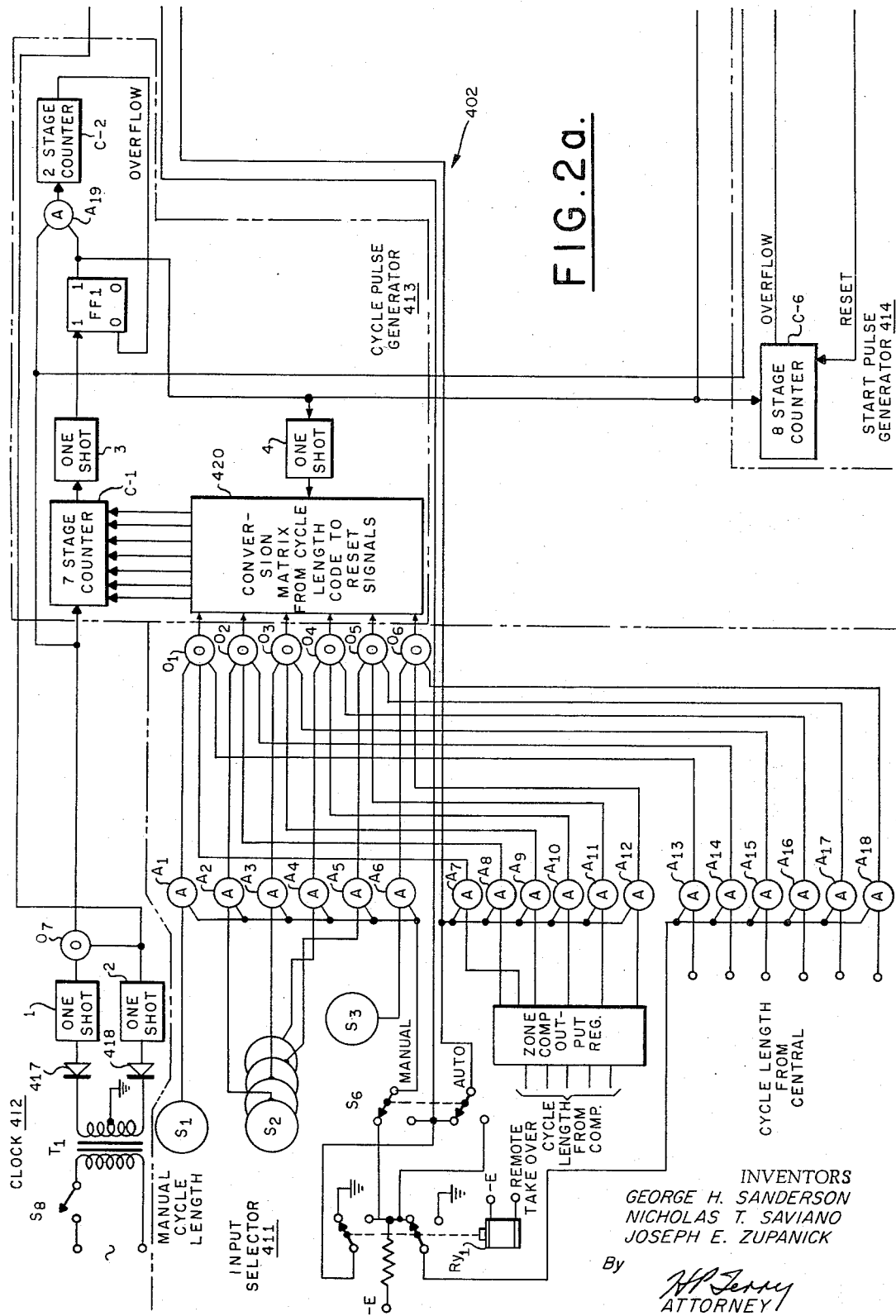

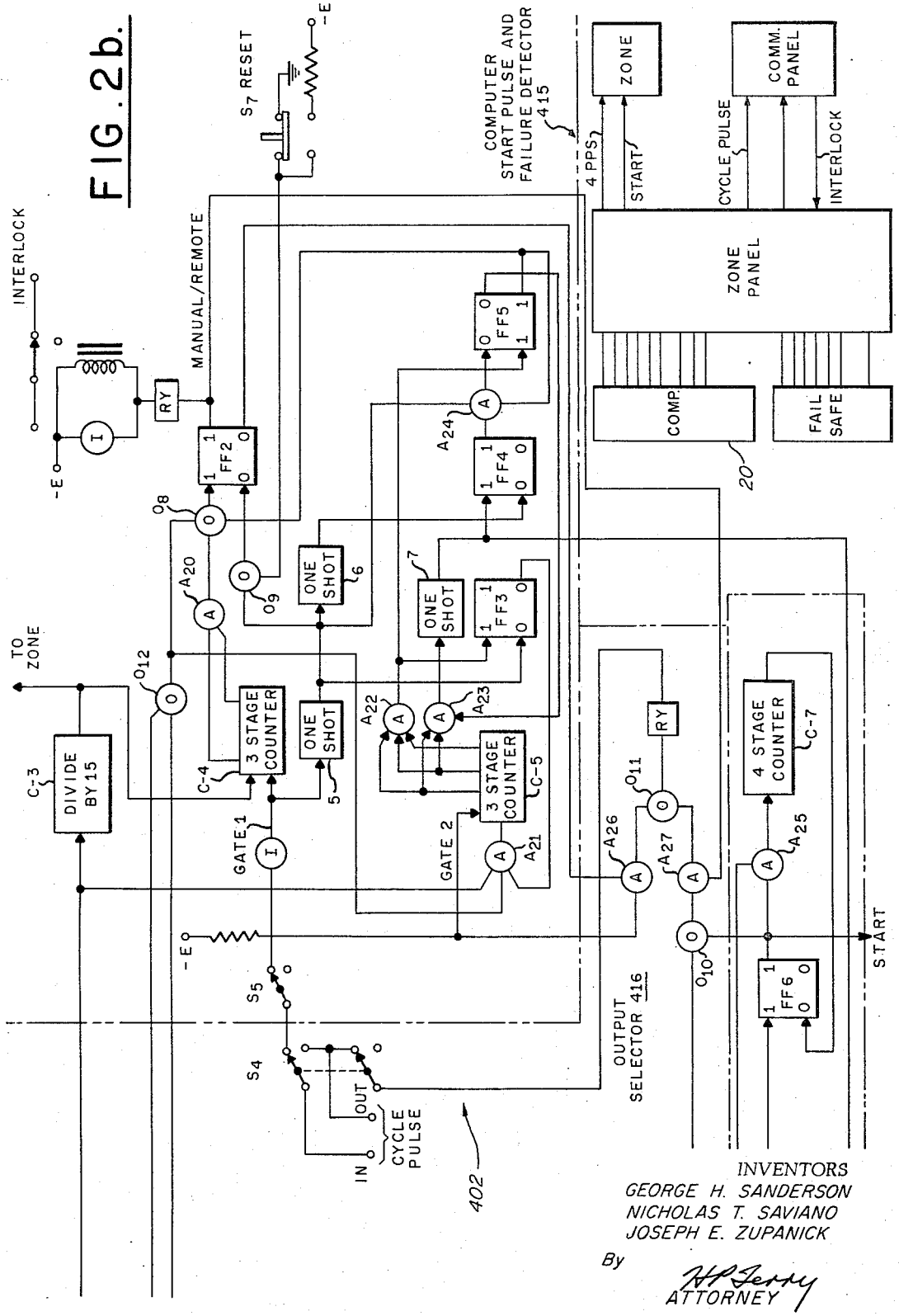

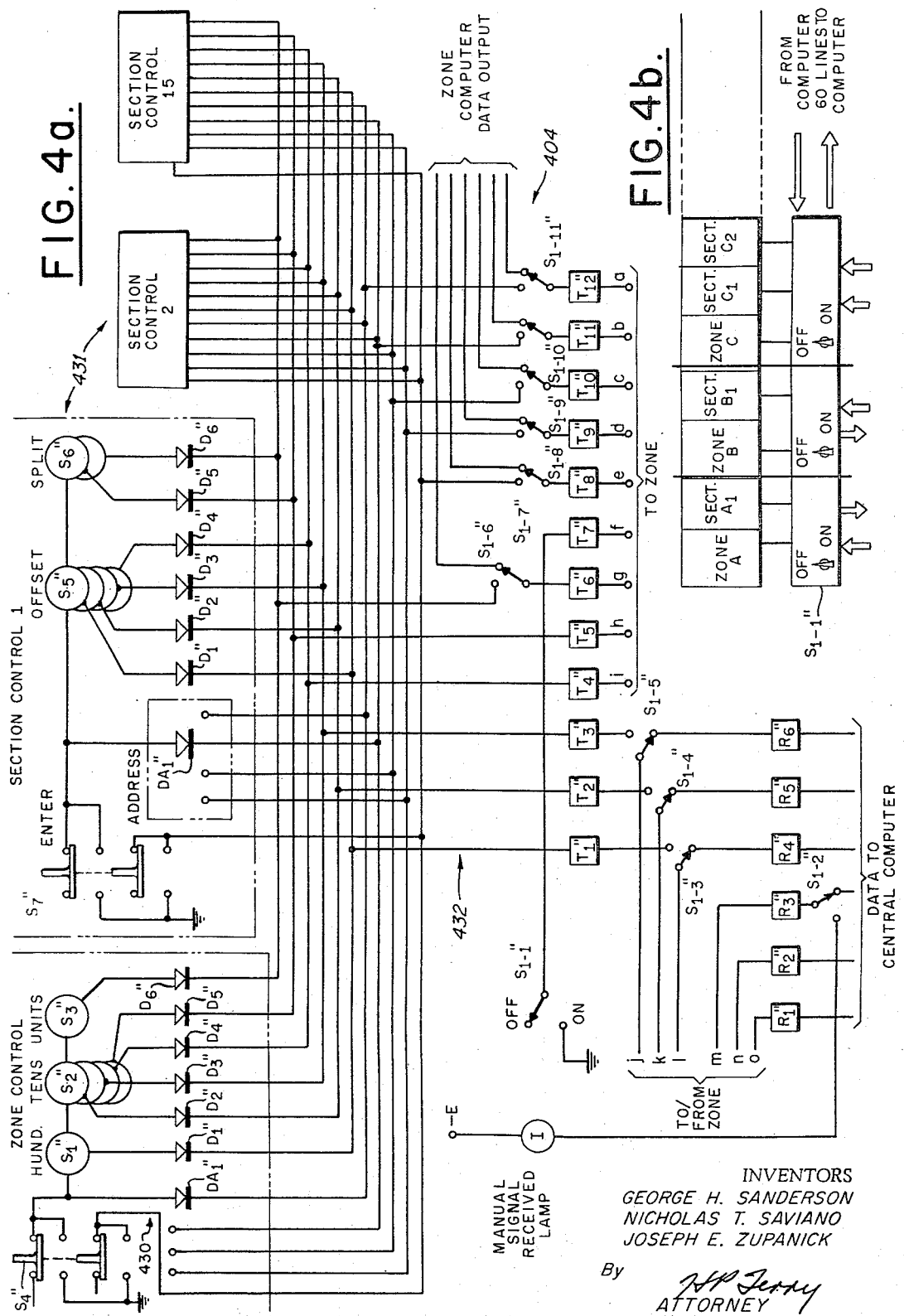

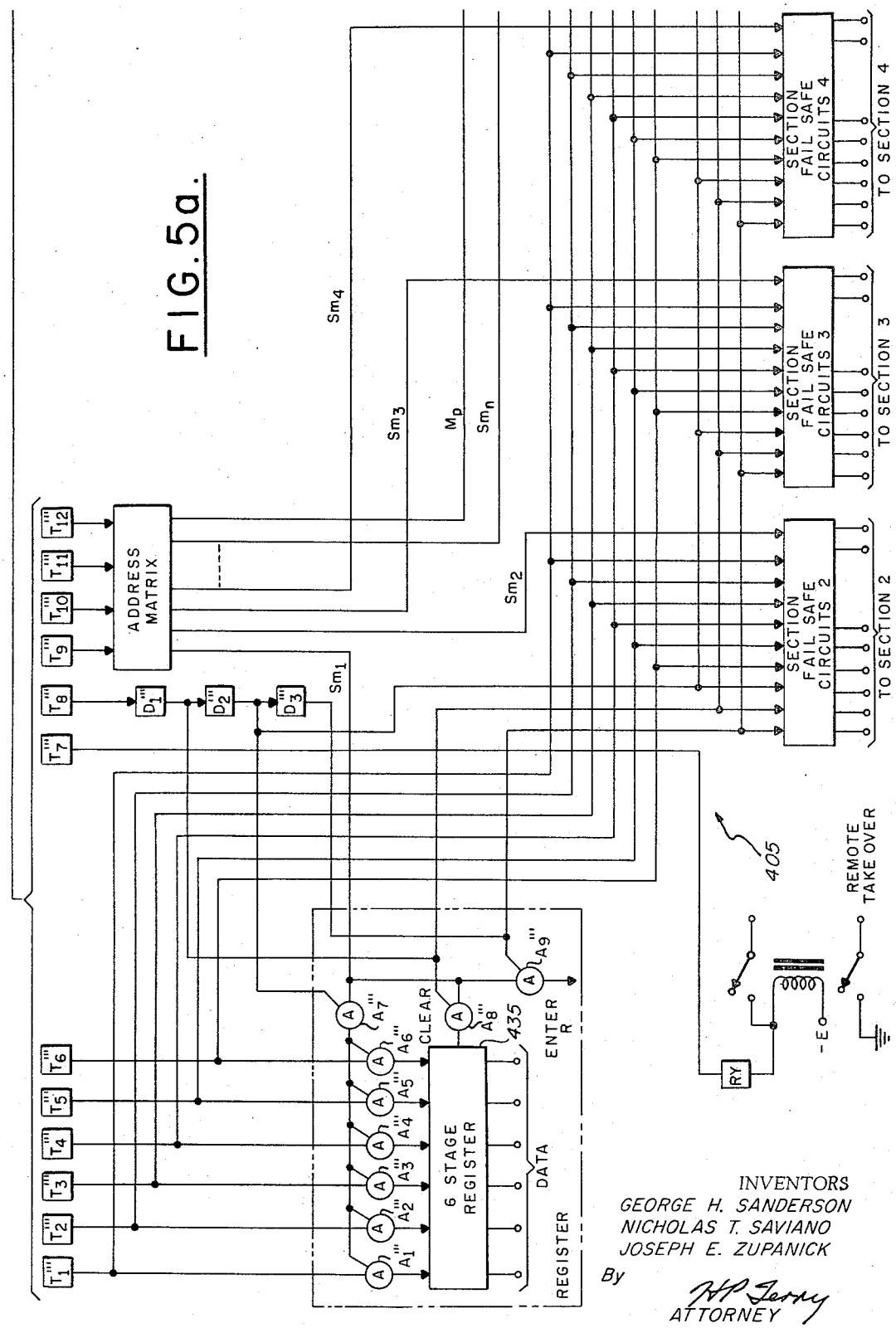

ABSTRACT OF THE DISCLOSURE

An auxiliary reference signal generating means for traffic or other control systems utilizing one or more computers for providing binary signals representative of traffic cycle having a constant number of pulses representing cycle duration and a repetition frequency that is a function of traffic movement and having a distinctive start pulse, offset and split where the auxiliary reference means automatically tracks the binary signals, generates auxiliary signals identical to and synchronized with the original signals, and switches between the original and auxiliary signals without introducing transients in the system in the event of malfunction. Means for manually selecting desired cycle, offset and split signals and selectively overriding the automatic signals is also provided.

---

The present invention relates to traffic and other control systems and particularly to means for allowing automatic or manual control of particular portions of the system while serving as an auxiliary reference unit for certain predetermined functions.

While the present invention will be explained with reference to a traffic control system auxiliary reference unit for purposes of example, it will be appreciated that it is equally applicable to other types of control systems for providing the functions explained in Ser. No. 452,974 entitled, Traffic and Other Control Systems, concurrently filed on or about May 4, 1965, in the names of Raoul M. Giulianelli, John J. King, Nicholas T. Saviano and Joseph E. Zupanick. In the traffic control system of said Ser. No. 452,974 certain basic parameters are generated to control the intersection controllers. These parameters are designated as cycle, offset, and split and are defined in said Ser. No. 452,974.

The present invention is capable of assuming control over predetermined portions of the system and generating the functions of providing cycle, offset and split information automatically in the event of malfunction or by manual selection if desired. The present invention will therefore be used in lieu of a more expensive and complex data processor or computer assembly.

The present invention is capable of being used in a system where a hierarchy of control is exercised such as a monitor over several zones.

It is therefore a primary object of the present invention to provide in a control system a means for providing an auxiliary reference unit which may be automatically or selectably utilized in lieu of the primary reference unit.

It is a further object of the present invention to provide an auxiliary reference unit in a control system which automatically assumes control in the event of a malfunction of a portion of the system or may be selectively engaged to assume control over a portion of the system.

It is a further object of the present invention to provide an auxiliary reference unit for a control system which in the event of malfunction of the primary reference unit continues to provide similar information to that other primary reference unit without introducing transients in the system.

These and other objects of the present invention will become apparent by referring to the drawings and specification in which:

FIGS. 1a and 1b comprise a portion of a traffic control system in block diagram form with FIG. 1b showing a detailed front view of a zone auxiliary manual control panel;

FIGS. 2a and 2b are schematic wiring diagrams partially in block form of a typical zone auxiliary panel;

FIG. 4a is a schematic wiring diagram partly in block form of a portion of a typical central failsafe panel;

FIG. 4b is a schematic block diagram of a typical central failsafe panel; and

Figure 5B:
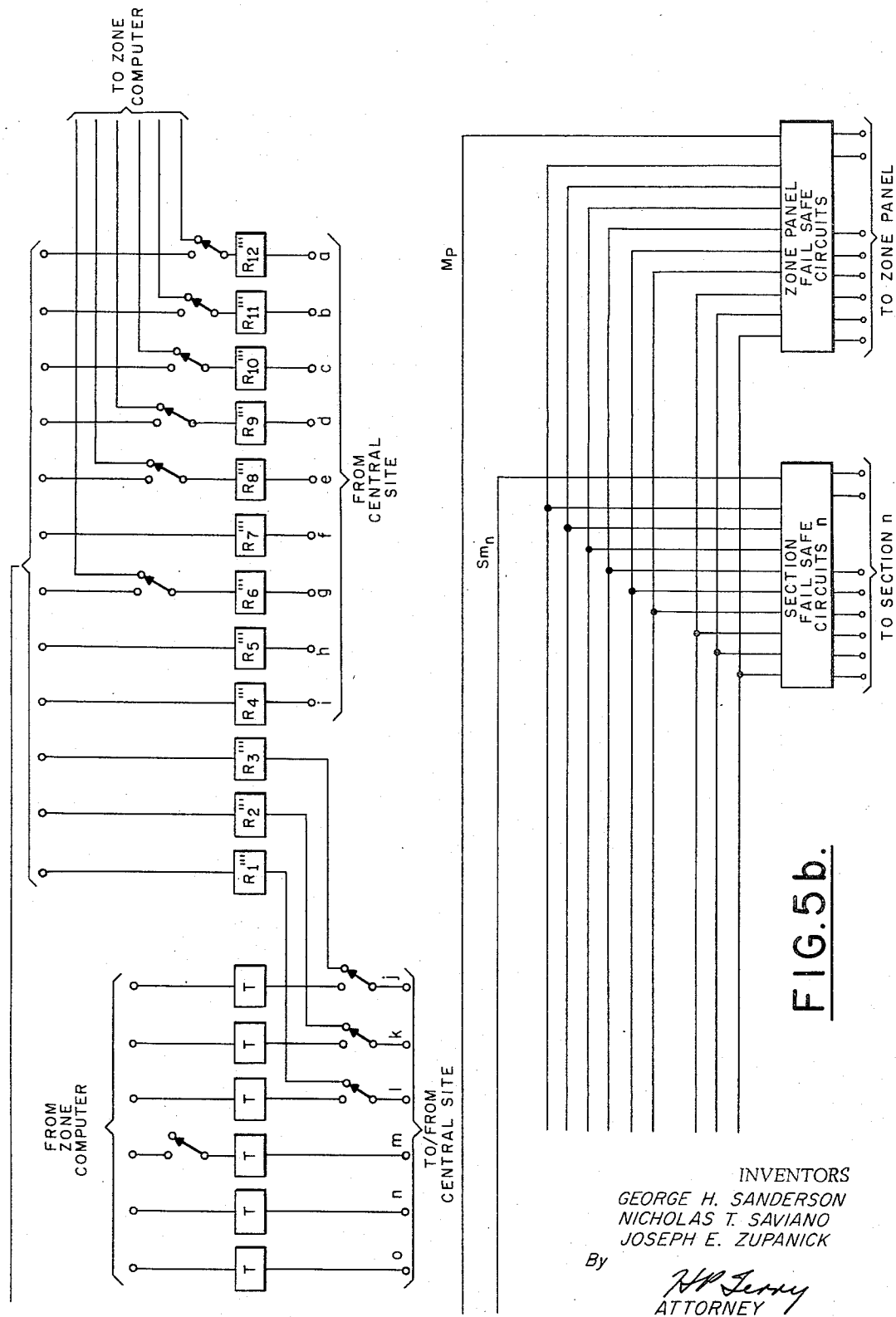

FIGS. 5a and 5b in combination provide a schematic wiring diagram of typical failsafe circuits in the zone auxiliary panel that are cooperative with the circuits of FIG. 4a.

Referring now to FIGS. 1a and 1b, the zone auxiliary manual control panel (ZAMP) 27 shown in FIG. 1b comprises at least one zone control panel 400 and one or more section control panels 401 associated with respective zone control panels. The central auxiliary manual control panel (CAMP) 15 which is shown in FIG. 1a is similar in appearance to the ZAMP 27 except that the CAMP 15 further includes indications pertaining to each zone and switching apparatus for controlling each zone. Since the equipment in the two panels are similar except for portions to be explained, an explanation will be provided only with respect to the ZAMP 27.

Briefly, as shown in FIG. 1a and more fully described in said Ser. No. 452,974 entitled Traffic and Other Control Systems, the central auxiliary manual control panel (CAMP) 15 is connected between the central input/output unit 11 and the central telemetry equipment 16. In the event of a malfunction at the central control site of the computer 10 or input/output unit 11, the (CAMP) 15 may assume the functions of providing cycle, offset, and split information for the entire system or any portion of which that has malfunctioned. Alternatively, manual control of the zone equipment may be provided when manually selected.

The CAMP 15 also has central failsafe equipment which is cooperative with a central failsafe decoding unit associated with the ZAMP 27 to provide a direct manual control link from the central site to the intersection controllers.

As shown in FIGS. 1a, 1b and more fully described in said Ser. No. 452,974, entitled Traffic and Other Control Systems, the zone site also includes a zone auxiliary manual control panel 27 which permits automatic or manual control of all sections of that zone should the zone data processor (ZDP) 20 fail. The panel 27 is inserted between the computer 20 and the communication equipment 28 on the offset, split and cycle pulse lines, and it takes over these functions when the ZDP 20 malfunctions. Alternatively, the panel 27 can be manually activated. An all-digital implementation is used which results in a transient-free switch-over as the computer 20 goes down, is repaired and comes back on line. The panel 27 is modular, to allow it to be tailored to each individual zone configuration. It has two basic modules. The zone module, one of which is required for each zone, takes over the function of cycle pulse generation. The section module, one per section, provides the selection of split and offset.

In normal operation, with the computer running, the computer cycle pulses go directly to the cycle pulse transmitter. They also maintain synchronization between the computer cycle pulses and a cycle pulse generator contained in the zone module. If the computer 20 should go down, the cycle pulses will stop. Generally, the zone input/output unit (IOU) output registers will remain stable, and the cycle pulses generated by the zone panel 27 will be gated to the cycle pulse transmitter. Split and offset will be obtained from the corresponding IOU registers. A critical intersection controller (CIC) changeover signal will be transmitted to the critical intersection controllers, to convert them to CIC local controllers. The overall transition will be transient free as far as the local controllers are concerned, with no discernible effect on traffic.

When the computer 20 has been repaired, it samples the zone panel cycle pulses, synchronizes them, and resumes control simply by starting to transmit its cycle pulses. This transition will also be transient free.

If the computer down time is lengthy, so that traffic demand changes, or if it is desired to make manual changes in cycle, split or offset, this can be accomplished on a zone system or section basis by switching the associated module to manual and inserting the desired setting in the digital detent switches.

Figure 3:
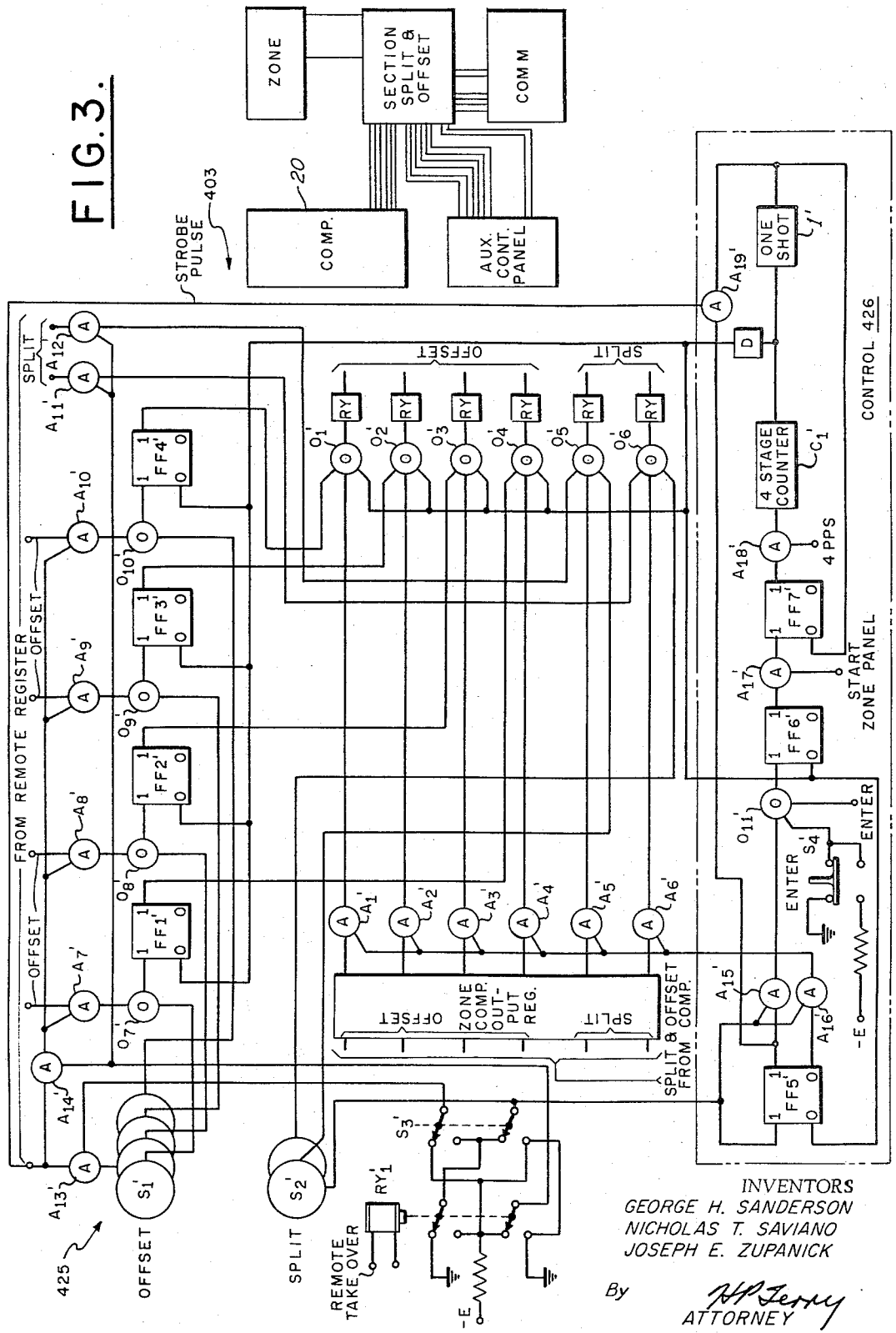
FIG. 3 is a schematic wiring diagram of a typical section auxiliary panel.

The ZAMP 27 permits direct manual or automatic control of the intersection controllers in the event of a ZDP 20 failure. The zone control panel 402 shown in FIGS. 2a and 2b generates the cycle pulse, and start pulse information for the controllers. Each section control panel 403 shown in FIG. 3 is capable of supplying split and offset information. The ZAMP 27 has four modes of operation.

(1) *Normal.*—The cycle pulse, start pulse, split and offset from the ZDP 20 are relayed directly to the controllers.

(2) *Computer down either intentionally or unintentionally.*—Circuits in the zone control panel 402 detect the loss of the cycle pulse, or start pulse, and automatically switch the cycle pulse and start pulse generated within the zone control panel 402 onto the line to the controllers. The system memorizes the last value of cycle pulse repetition rate, split and offset held by the ZDP 20.

(3) *Manual.*—Cycle length, split and offset are determined by the front panel switches on the zone and section control panels 400 and 401, respectively, independent of the ZDP 20.

(4) *Central Failsafe.*—The central failsafe system can override the other three modes. The operation is similar to mode 3 above, except that the cycle length split and offset are transmitted from a remote central failsafe panel 404 shown in FIG. 4 and are held in local registers in the central failsafe decoding unit 405 shown in FIG. 5, in a manner to be explained. The units will be described in the following order.

(1) zone control unit 402
(2) section control unit 403
(3) central failsafe panel 404
(4) central failsafe decoding unit 405

The zone control unit 402 shown in FIGS. 2a and 2b, consists of the following sub units.

(1) input selector 411
(2) clock 412
(3) cycle pulse generator 413
(4) start pulse generator 414
(5) computer start pulse and failure detector 415
(6) output selector 416

In the input selector 411 as shown in FIG. 2, the zone control panel receives 6 bit input data on cycle length from three sources which are selected by AND gates $A_1$–$A_6$, $A_7$–$A_{12}$ and $A_{13}$–$A_{18}$ respectively and combined onto 6 lines by OR gates $O_1$–$O_6$.

The manual cycle length data is obtained from three switches $S_1$, $S_2$, $S_3$, on the zone control panel 400 of FIG. 1b, the computer cycle data is obtained from the zone computer output register, and the central failsafe cycle length data is obtained from the appropriate storage register in the central failsafe decoding unit. $S_1$ is a single pole two position rotary switch. The two positions represent 0 and 1, i.e., the hundreds digit of the three digit cycle data no. The switch $S_2$ is a four pole ten position rotary switch. The ten positions represent the digit 0, 1 . . . 9, i.e., the ten digit of the three digit cycle data no. The four poles supply a four digit binary number, a unique number for each of the ten decimal digits. The switch $S_3$ is a single pole two position rotary switch. The two positions represent 0 and 5, i.e., the unit digit of the three digit cycle data number.

With switch $S_6$ and relay $Ry_1$ in the normal position as shown in FIG. 2a, the computer input gates $A_7$–$A_{12}$ are activated, and the other two sets of gates are held off. If switch $S_6$ is thrown to the manual position, the manual gates $A_1$–$A_6$ are activated, while if the relay $Ry_1$ is energized, gates $A_{13}$–$A_{18}$ are activated while gates $A_1$–$A_{12}$ are held off independent of the position of switch $S_6$.

The clock circuit 412 generates two signals, 120 p.p.s., and 60 p.p.s. from the 60 c.p.s. power line. The 60 cycle line is coupled to the clock 412 via $T_1$, a step down, center tapped transformer, the output windings of which are connected to pulse shaping circuits 417 and 418, each having a diode and a one shot multivibrator 1 and 2 respectively. Each diode and one shot multivibrator constitute a pulse shaper circuit which delivers a standard clock pulse at each negative zero crossing of the 60 c.p.s. signal. The two pulse shapers are connected to detect each zero crossing. The outputs are combined in an "OR" gate $O_7$ to give the 120 p.p.s. signal. The 60 p.p.s. signal is derived from one of the zero crossing detectors.

The cycle pulse generator 413 divides the 120 p.p.s. clock signal by a selected number, N to give an output signal ("cycle pulse") of such a frequency that 200 of them will equal the desired cycle length. A pulse forming circuit is included to define the output cycle pulse width.

In operation, a 7 stage counter $C_1$ is set to $128-N$ initially, and then counts the 120 p.p.s. clock signal until it produces an overflow which is shaped in one shot multivibrator 3. This overflow turns on the cycle pulse flip-flop FF1, which in turn activates AND gate $A_{19}$. The 120 p.p.s. signal is counted in the two stage counter $C_2$ until an overflow is reached, thus timing a $\frac{1}{30}$ sec. interval. The overflow resets the flip-flop FF1 terminating the cycle pulse. One shot multivibrator 4 detects the start of the cycle pulse and gates the seven wire conversion matrix output into counter $C_1$. The counter $C_1$, has just overflowed, and is, therefore, currently set to zero. The output of the conversion matrix 420 sets the counter $C_1$ to $128-N$, and the above cycle is repeated.

The conversion matrix 420 accepts inputs from the input selector 411, and generates corresponding output signals to conform to the Boolean equations as follows: Let $X1 \rightarrow X6$ equal the input cycle length request, $X1 = MSD$ where $X6 = 0, 5$ (units)
$X5-X2 = 0, 1, 2, 3, 4, 5, 6, 7, 8, 9$ (tens)
$X1 = 0, 1$ (hundreds)

and $S_1$–$S_7$ equal the output set signals to counter $C_1$. Then the conversion matrix realizes the following equation where R is the reset signal from one shot 4.

$$S_1 = [\overline{X}1 + \overline{X}2 \cdot \overline{X}3 \cdot \overline{X}4 \cdot \overline{X}5] \cdot R$$
$$S_2 = [\overline{X}4 \cdot (\overline{X}3 + \overline{X}5 \cdot X0 \cdot X1)$$
$$\qquad + \overline{X}4 \cdot (X1 \cdot X3 + X5 \cdot X1 + X5 \cdot \overline{X}0 \cdot \overline{X}2)] \cdot R$$
$$S_3 = [X5 \cdot (X1 \cdot \overline{X}3 \cdot \overline{X}4 + X3 \cdot X4 + X4 \cdot \overline{X}6)$$
$$\qquad + \overline{X}5(\overline{X}1 \cdot \overline{X}6 + \overline{X}3 \cdot X4 + X4 \cdot X6)$$
$$\qquad + \overline{X}1 \cdot \overline{X}2 \cdot X6 + X1 \cdot X2] \cdot R$$
$$S_4 = \{X1 \cdot (X3 \cdot [\overline{X}5 \cdot X6 + \overline{X}5 \cdot X4 + X5 \cdot X4 \cdot \overline{X}6]$$
$$\qquad + \overline{X}3 \cdot [\overline{X}2 \cdot \overline{X}4 \cdot X5 + X4 \cdot \overline{X}5 \cdot \overline{X}6]) + \overline{X}1 \cdot (\overline{X}5[X6 + X4]$$
$$\qquad + \overline{X}2 \cdot \overline{X}4 \cdot X6) + X5 \cdot (X4 \cdot X6 \cdot \overline{X}3 + X2 \cdot \overline{X}4 \cdot \overline{X}6) \cdot R$$
$$S_5 = \{X1 \cdot (X4 \cdot X6 + \overline{X4} \cdot \overline{X6})(\overline{X4} \cdot \overline{X6} + \overline{X4} \cdot \overline{X6})\} \cdot R$$
$$S_6 = X5 \cdot R$$
$$S_7 = X6 \cdot R$$

The above equations are instrumented in a conventional NOR-gate pyramid.

In the start pulse generator 414, the cycle pulses from the flip-flop FF1 are counted by the 8 stage counter $C_6$. An overflow is generated at every 200th input. This overflow sets the start flip-flop FF6. The flip-flop FF6 opens AND gate $A_{25}$, allowing the 120 p.p.s. clock to enter the "divide by 12" counter, $C_7$. This defines an interval of 0.1 second. The first overflow from the counter $C_7$ resets the flip-flop FF6, terminating the start pulse. Under normal operation (mode 1) the detected computer start pulse from one shot multivibrator 7 resets the counter $C_6$ to zero, synchronizing the panel start pulse with the computer start pulse.

In the computer start pulse and failure detector 415, the 60 p.p.s. clock output is counted down to 4 p.p.s. in counter $C_3$ to provide a low frequency clock. The 4 p.p.s. signal is counted in the three stage counter $C_4$. The inverted computer generated cycle pulse is used as a reset signal for the counter $C_4$ and is applied on line 20 "gate 1." As the minimum cycle pulse rate is 1 p.p.s., the counter $C_4$ will normally never reach a count greater than 4. If the computer cycle pulse vanishes for any reason, this counter can reach a count of 5, which is detected in the AND gate $A_{20}$, and is used to set the "computer out" flip-flop FF2. This energizes the manual/remote signal line, which turns on warning light 1 on the panel 400, and opens the interlock circuit to the critical intersection controller (CIC) units with relay 1. One shot multivibrator 5 detects the end of a cycle pulse, and resets the flip-flop FF2. The flip-flop FF2 may be reset manually by the reset switch, $S_7$.

The computer cycle pulse is used to enable the start pulse detector-counter $C_5$. This three stage counter counts the 60 p.p.s. clock signal, which is gated in by AND gate $A_{21}$. This gate is enabled if the flip-flop FF3 is reset (normal state) and the system is in the normal mode. The line labeled "gate 2" is connected to the reset input of each stage of counter $C_5$. When there is no pulse present on line "gate 2" the counter is forcibly held in the reset condition. Where a pulse exits on the line, the reset condition is removed and the counter is able to count. If the computer cycle pulse is a normal cycle pulse, the counter $C_5$ will be reset before it reaches a count of 3, and no output will be obtained. However, if the computer cycle pulse is the start pulse, which is normally 3 times the length of the normal cycle pulse, the counter $C_5$ will pass the count of 3.

This is detected by AND gate $A_{23}$ if flip-flop FF5 is in its normal state. One shot 7 generates the computer "start pulse signal." This signal turns flip-flop, FF4, on, and resets the start pulse counter, $C_6$. If the flip-flop FF5 is on, the AND gate $A_{24}$ is activated, and the signal from one shot 5 (the end of cycle pulse) resets the flip-flop FF5. One shot 6 delays the signal of one shot 5 and resets the flip-flop FF4.

If the computer cycle pulse should fail such that the pulse remains on, counter $C_5$ will reach a count of 7, indicating that the cycle pulse line has failed in the ON mode. This is detected by AND gate $A_{22}$ which sets flip-flops FF3 and FF5. The flip-flop FF3 blocks the input to counter $C_5$ so that the count is frozen, while the flip-flop FF5 sets the "computer out" flip-flop, FF2, automatically switching the system to manual control. The fall of the computer cycle pulse signal from the on to the off phase, terminating the failure, is detected by one shot 5, which resets the flip-flops FF2, FF3 and FF5 thereby terminating the "failed on" mode.

If the unit is in either manual or central fail-safe modes, the output of OR gate $O_{12}$ forces the flip-flop FF2 in to the manual mode, and blocks the input to counter $C_5$, disabling the start pulse detector.

In the output selector 416, the "manual" cycle pulse from the flip-flop FF1 and the manual start pulse from the flip-flop FF6 are combined in OR gate $O_{10}$ to form the "manual cycle pulse data." If the flip-flop FF2 is on, the manual/remote signal gates this signal through AND gate $A_{27}$ and OR gate $O_{11}$ to the output, while if the flip-flop FF2 is off, the "normal" signal gates the computer cycle pulses through AND gate $A_{26}$ and OR gate $O_{11}$ to the output.

The cycle pulse input/output is controlled by switches $S_4$ and $S_5$. If these switches are as shown, the computer cycle pulse enters the system, and the output comes from the output selector 416, while if switch $S_4$ is thrown to the alternate position, the computer cycle pulse is coupled to the output line, bypassing the unit completely. Switch $S_5$ can be used to simulate computer cycle pulse failure for test purposes.

The section control panel 403 shown in FIG. 3, consists of two main sections, the data selection section 425 and control portion 426. In the data selection section 425, the data to be transferred consists of 4 bits of "offset" data and two bits of "split" data. In the normal mode of operation, switch $S_3'$ is as shown and flip-flop FF5' is in the reset state. Switch $S_3'$ and flip-flop FF5' enable AND gate $A_{16}'$ which in turn enables AND gate $A_1'$–$A_6'$. The offset and split data from the zone computer output register is transmitted through gates $A_1'$–$A_6'$ to OR gates $O_1'$–$O_6'$ and on to the output lines. Should the zone computer fail, the last generated offset and split data is retained by the computer output register and is thereby transmitted to the section panel after the failure has occurred. AND gates $A_{13}'$ and $A_{14}'$ as well as switch $S_2'$ are disabled thereby precluding the manual and remote modes of operation.

In the manual mode, switch $S_3'$ is placed into the down position enabling AND gate $A_{13}'$ and setting the flip-flop FF5' which in turn enables gate $A_{15}'$ and disables gate $A_{16}'$. Manual data switches $S_1'$ and $S_2'$ are thereby enabled, the manual mode is effected and the normal mode is precluded. Switch $S_1'$ can be set to one of six positions, each position resulting in a unique four digit binary number on the four switch deck output lines. Similarly, switch $S_2'$ can be set to one of three positions, each position resulting in a unique two digit binary number.

In the preferred embodiment of the invention, when the offset data is changed, the change is preceded by a two second transmission of all ones on the 4 lines starting two seconds after the start pulse. In the normal mode, the computer handles this timing and format problem; and the six bits of data are gated directly through AND gates $A_1'$–$A_6'$ and OR gates $O_1'$–$O_6'$ onto the output lines.

In the manual, or remote failsafe mode, the change of offset must be synchronized to the current start pulse. A four bit register FF1'–FF4' is included to provide for storage and synchronization. In the manual mode, the offset data is set up on switch $S_1'$ and the ENTER signal is given by means of switch $S_4'$. Starting two seconds after the next start pulse time, a two second reset is generated which clears the four stage register to zero, and forces four ones onto the offset output through OR gates $O_1'$–$O_4'$. At the end of the reset signal, a strobe signal is gated through AND gate $A_{13}'$ to sample the state of the offset switch, $S_1'$, which is transferred to the holding register through OR gates $O_7'$–$O_{10}'$. The holding register then drives the offset output lines through OR gates $O_1'$–$O_4'$. The split data from switch $S_2'$ is transferred directly through OR gates $O_5'$, $O_6'$ to the split output lines. Switch $S_2'$ and AND gate $A_{13}'$ are enabled by the output of the manual-automatic switch, $S_3'$. These operations are further elaborated hereunder with section entitled "control."

In the failsafe mode, relay $Ry_1'$ is energized overriding the setting of switch $S_3'$, and forcing the data selection to be taken from the 6 bit register 435 in the failsafe decoding unit 405 of FIG. 5 corresponding to the section selected at the central control of panel (FIG. 3). An enter signal from the failsafe decoder, replaces the enter switch signal to start the change procedure. The sequence proceeds as above, except that the strobe is gated through AND gate $A_{14}'$ by the relay $Ry_1'$ signal instead of through AND gate $A_{13}'$. Offset data from the failsafe decoder 405 is sampled, and entered into the four bit register through AND gates $A_7'-A_{10}'$ and OR gates $O_7'-O_{10}'$. The relay signal gates the failsafe split data through AND gates $A_{11}'$, $A_{12}'$ and OR gates $O_5'$, $O_6'$ onto the output line.

The control section 426 generates two signals; a two second long reset signal which starts two seconds after the start pulse; and a strobe which is generated at the fall of the reset signal. There are three conditions which will initiate control action:

(1) A signal from the ENTER switch $S_4'$.
(2) An ENTER signal from the failsafe decoder 405.
(3) Switching from manual or failsafe mode to normal.

When either of the first two signals appear, the request flip-flop FF6' is set, enabling AND gate $A_{17}'$ which passes the next start pulse from the zone panel 402. This pulse sets control flip-flop, FF7' which opens AND gate $A_{18}'$, allowing the 4 p.p.s. signal from the zone panel 402 to enter the four stage counter $C_1'$. The last stage of counter $C_1'$ enters the "one" state two seconds from the start of the count. The amplified output of this stage is the required reset signal. This signal turns flip-flop FF6' off as well as generating the all "ones" condition on the offset lines.

When the four stage counter $C_1'$ overflows, the one shot 1' generates the required strobe signal. This signal turns off flip-flop FF7', disconnecting the input to the counter $C_1'$. The strobe is gated through AND gate $A_{19}'$ by the normal manual flip-flop FF5' when this flip-flop is in the manual mode.

As there is no reason to expect the zone computer generated offset to be the same as the manual or failsafe offset, the transition from either of these modes to the normal mode requires special provision to make sure that the proper sequence and format for changing offset is observed. When not in the normal mode flip-flop FF5' is held in the manual mode by the signal from switch $S_3'$. This signal also inhibits AND gates $A_{15}'$ and $A_{16}'$. When the relay on switch $S_3'$ returns the system to normal, this input to FF5' is removed and the AND gate $A_{15}'$ generates a signal through OR gate $O_{11}'$ to start a change cycle. The reset signal generates the change signal of all ones, resets the 4 bit register, and sets FF5' to the normal mode, closing the strobe gate $A_{19}'$ and opening $A_{16}'$, which gates the computer data onto the output lines.

The central failsafe panel 404 shown in FIG. 4a is a modular structure. Each zone with which it is to communicate is represented by a zone failsafe panel 430, a number of section failsafe panels 431 equal to the number of sections associated with the zone site, and a conversion control section 432. A decoding unit including conversion equipment is located at each of the zone sites.

The central failsafe panel 404 can be used to provide direct manual control of cycle length, offsets and splits for one or more zone sites, overriding both the zone computer and the central computer.

The zone failsafe panel 430 provides six bits of cycle length data, a four bit address, and a enter signal. The cycle data is obtained from three switches $S_1''$, $S_2''$, $S_3''$, similar to those on the zone control panel as described above. These switches are connected to give an open circuit for a logical zero, and a ground connection through the zone enter switch, $S_4''$ for a logical one. The zone enter switch $S_4''$ also drives the four bit address, which is prewired for each module (the address is 0001 of FIG. 4b). The diodes $D_1''-D_6''$ and $Da_1''$ are provided to isolate the zone and section panels from each other. The second pole on all "enter" switches on the panels associated with a common site are tied together to give an "enter" signal to the selected one section.

With respect to the section failsafe panel 431, each section panel 431 is the same, except for the four bit address section. The contain a switch $S_5''$ to generate the offset data, and a second switch $S_6''$ to generate the split data, similar to those on the auxiliary control panel as described above. The resulting six bits of data are coupled through decoupling diodes $D_1''-D_6''$ to the output data bus. The switches are tied to the section enter switch $S_7''$ as in the zone failsafe panel 430. The section enter switch $S_7''$ also activates the address section through the $Da_2''$ decoupling diode.

The conversion control section 432, in the normal mode, has six D.C. transmitters in use, sending data to the zone site ($T_6''$, $T_8''-T_{12}''$) and six D.C. receivers being used to repeat back information ($R_1''-R_6''$). There are a total of 15 lines in the interconnecting cable. When the failsafe unit is to be used to control the zone site, twelve D.C. transmitters ($T_1''-T_{12}''$) and one D.C. receiver ($R_3''$) are required. In normal operation the switches are as shown in FIG. 4a. Conversion to the remote mode of operation is effected by closing switch $S_{1-1}''$. This is the on-off switch shown in the conversion control equipment in FIG. 4b. Closing switch $S_{1-1}''$ results in the closing of switch $S_1''_{-2}$ to $S_1''_{-11}$ completeing the conversion procedure at the central site. A particular zone is selected for remote control by means of the associated switch $S_1''_{-1}$. FIG. 4a represents one set of zone/section equipment of the entire central failsafe panel shown in FIG. 4b. The address is the same for the ten zones at the ten zone sites and the addresses for the correspondingly numbered sections at the ten sites are the same. The switching arrangement shown in FIG. 4a is designed to make maximum use of the existing facilities; the conversion switch $S_1''_{-6}$ to $S_1''_{-11}$ decouples the computer from D.C. transmitters $T_6''$, $T_8''-T_{12}''$ and ties them to the indicated address and data lines. The conversion switch, sections $S_1''_{-3}$ to $S_1''_{-5}$, switch three tie lines from D.C. receivers $R_4''-R_6''$ to D.C' transmitters $T_1-T_3$.

The switch $S_1''_{-2}$ switches the output of $R_3''$ from the computer to the manual signal received lamp. Conversion switch $S_1''_{-1}$ drives a signal through D.C. transmitter $T_7''$ which reorganizes the zone site receiver to reflect the failsafe mode and sets the auxiliary manual panels to the failsafe mode, overriding normal and manual modes. This is accomplished by transmitting the signal from $T_7''$ on FIG. 4 to $R_7'''$ and $D_7'''$ on FIG. 5. This results in energizing relay Ry on FIG. 5a which in turn energizes the remote takeover relays on the auxiliary panels of the selected site.

The central failsafe decoding unit 405 shown in FIGS. 5a and 5b, contains the zone conversion equipment required to convert the system from the normal to the central failsafe mode. An address decoder and a set of storage registers hold the received data. As shown in FIG. 5b, the normal communication channel between the central site and the zone site where the central failsafe decoder units 405 are located consists of 6 transmitters T to the central site to repeat back data, and 9 receivers ($R_4'''$ to $R_{12}'''$). Six of these receivers ($R_6'''$, $R_8'''-R_{12}'''$) are used to receive data for entry into the zone computer. When a signal is received on receiver $R_7'''$ the relay Ry of FIG. 5a is energized, placing the unit 405 and the auxiliary manual panel 27 of FIG. 1 into the failsafe mode.

The relay Ry switches three tie lines from the transmitter output to the inputs of receivers $R_1'''-R_3'''$, switches the output of receiver $R_6'''$, $R_8'''-R_{12}'''$ from the computer to the failsafe decoder panel, and forces a 1 into transmitter $T_3'''$, signalling to the central site that the switchover to failsafe operation has been performed.

In the address matrix shown in FIG. 5a, when an entry button is pushed at the central failsafe panel, a four bit address is generated which specifies whether the associated six bit data is cycle length information, or if it is offset and split data and which zone or section panel it should go to. The address matrix decodes these addresses, and energizes the appropriate address line, $Mp$ or $Sm_1$, $Sm_2$, etc.

One six bit storage register 435 is provided for the zone panel, and one for each of the section panels. When an enter button is pressed on the central failsafe panel, an enter signal appears at transmitter $T_8'''$. This signal is delayed in delay $D_1'''$ (a one shot) to allow switch and line settling time. At the end of $D_1'''$, a pulse is generated which is gated through AND gate $A_8'''$ by the address line. This pulse sets the register 435 to zero. The pulse is delayed in delay $D_2'''$ (a one shot) to allow clearing time. A second pulse is generated after delay $D_2'''$.

This is gated through AND gate $A_7'''$ by the address line and enables AND gate $A_1'''-A_6'''$, which, in turn gate the six bit data from central into the register. The signal delay $D_2'''$ is delayed by delay $D_3'''$ to allow the data to settle in the register. The delayed signal is then gated by the address line through AND gate $A_9'''$ to form the "enter" signal used in the section control section.

Each register has six flip-flops, and 9 AND gates $A_1'''-A_9'''$ except for the zone manual panel unit. No enter signal is required here, thus only AND gates $A_1'''-A_8'''$ and the flip-flops are provided.

While the invention has been described in its preferred embodiments, it is to be understood that the words which have been used are words of description rather than of limitation and that changes within the purview or the appended claims may be made without departing from the true scope and spirit of the invention in its broader aspects.

We claim:
1. In a control system having means for generating a pulse train including a start pulse having a distinctive characteristic:
   (a) means responsive to signals representative of said pulse train for generating an auxiliary pulse train having identical characteristics with respect thereto including an auxiliary start pulse having said distinctive characteristic,
   (b) means responsive to said pulse train for providing synchronization between the original pulse train and said auxiliary pulse train, and
   (c) means for rendering said auxiliary pulse train effective in the event of disruption of said original pulse train, whereby the transition from said original pulse train to said auxiliary pulse train is transient free.

2. In a control system of the character described in claim 1 further including manually adjustable means for selectively generating a desired pulse train.

3. In a traffic control system having means for generating a pulse train wherein the occurrence of a constant number of pulses represents traffic cycle and including a start pulse having a distinctive characteristic:
   (a) means including cycle pulse generating means and start pulse generating means responsive to binary signals representative of said pulse train for generating an auxiliary pulse train having identical characteristics with respect thereto including an auxiliary start pulse having said distinctive characteristic,
   (b) means responsive to said pulse trains for providing synchronization between the original pulse train and said auxiliary pulse train, and
   (c) failure detector means for rendering said auxiliary pulse train effective in the event of disruption of said original pulse train, whereby the transition from said original pulse train to said auxiliary pulse train is transient free.

4. In a traffic control system of the character described in claim 3 further including manually adjustable means for selectively generating a desired pulse train.

5. In a traffic control system having computer means including means for generating binary signals representative of a pulse train wherein the occurrence of a constant number of pulses represents traffic cycle and whose repetition frequency is a function of traffic conditions and including a start pulse having a distinctive characteristic and further including means for generating signals representative of offset and split:
   (a) means including cycle pulse generating means and start pulse generating means responsive to said binary signals representative of said pulse train for generating an auxiliary pulse train having identical characteristics with respect thereto including an auxiliary start pulse having said distinctive characteristic,
   (b) means responsive to said offset and split signals for generating identical auxiliary offset and split signals,
   (c) means responsive to said pulse trains for providing synchronization between the original pulse train and said auxiliary pulse train, and
   (d) failure detector means for rendering said auxiliary signals effective in the event of disruption of the original signals, whereby the transition from said original signals to said auxiliary signals is transient free.

6. In a traffic control system of the character described in claim 5 further including manually adjustable means for selectively generating a desired pulse train.

7. In a traffic control system of the character described in claim 5 further including manually adjustable means for selectively generating desired offset and split signals.

8. In a traffic control system of the character described in claim 5 further including means for generating signals to properly institute a change in said offset during auxiliary control.

9. In a traffic control system of the character described in claim 5 including means for memorizing said traffic cycle, offset and split signals upon malfunction of said computer means to continue to provide a basis for generating said auxiliary signals.

10. In a traffic control system of the character described in claim 5 further including additional computer means for selectively generating second binary signals representative of a desired pulse train:
   manually adjustable means for selectively generating third binary signals representative of a desired pulse train, and
   gating means responsive to all said binary signals for selectively rendering one of said original, second or third binary signals effective.

References Cited

UNITED STATES PATENTS

| | | |
|---|---|---|
| 3,116,477 | 12/1963 | Bradbury. |
| 3,165,702 | 1/1965 | Gryseels et al. _____ 328—75 |
| 3,252,133 | 5/1966 | Auer, Jr. et al. _____ 340—35 |
| 3,289,097 | 11/1966 | Martin. |
| 3,302,170 | 1/1967 | Jensen et al. _____ 340—40 X |

ARTHUR GAUSS, *Primary Examiner.*

S. D. MILLER, JR., *Assistant Examiner.*